United States Patent [19]

Kloth

[11] 4,303,184

[45] Dec. 1, 1981

[54] BAG FOR A MOTOR VEHICLE, ESPECIALLY FOR A MOTORCYCLE

[75] Inventor: Wolfgang Kloth, Munich, Fed. Rep. of Germany

[73] Assignee: Bayerische Motoren Werke Aktiengesellschaft, Munich, Fed. Rep. of Germany

[21] Appl. No.: 74,542

[22] Filed: Sep. 11, 1979

[30] Foreign Application Priority Data

Sep. 22, 1978 [DE] Fed. Rep. of Germany ... 7828266[U]

[51] Int. Cl.³ ............................................... B62J 9/00
[52] U.S. Cl. ................................... 224/32 R; 190/52; 224/183; 280/289 A
[58] Field of Search .................. 224/183, 30 R, 30 A, 224/31, 32 R, 32 A, 33 R, 33 A, 34–36, 42.03 R, 42.03 A, 273, 309, 311, 318, 319, 328; 248/206 A; 211/DIG. 1; 280/5 F, 5 H, 202, 289 R, 289 A, 769; 206/818; 190/44, 52, 60, 61

[56] References Cited

U.S. PATENT DOCUMENTS

| 402,491 | 4/1889 | Thomas | 150/35 X |
| 2,288,105 | 6/1942 | Plotkin | 190/412 |
| 3,007,568 | 11/1961 | Kurland | 224/273 |
| 3,061,057 | 10/1962 | Miller | 190/44 |
| 3,237,327 | 3/1966 | Griggs | 206/818 |
| 3,910,540 | 10/1975 | Kayler | 248/206 A |
| 4,059,207 | 11/1977 | Jackson et al. | 280/289 A |
| 4,081,061 | 3/1978 | Tucker | 190/60 X |

FOREIGN PATENT DOCUMENTS

| 1051915 | 9/1953 | France | 224/273 |
| 2234173 | 1/1975 | France | 224/32 R |
| 877460 | 9/1961 | United Kingdom | 224/32 R |

Primary Examiner—Stephen Marcus
Attorney, Agent, or Firm—Craig and Antonelli

[57] ABSTRACT

A bag releasably fastenable to parts of a motor vehicle such as a motorcycle is disclosed. The bag is provided on at least one side wall with one or more holding magnets. The magnets may be sewn or sealed between the two layers of a two-layered side wall and the side wall may be releasably connected with the bag by means of a zipper.

7 Claims, 2 Drawing Figures

BAG FOR A MOTOR VEHICLE, ESPECIALLY FOR A MOTORCYCLE

BACKGROUND AND SUMMARY OF THE INVENTION

The present invention relates to a bag releasably fastenable to parts of a motor vehicle such as a motorcycle.

In a known bag of this type (German Utility Model No. 76 22 702), also referred to as a tank touring bag, a plurality of mounting straps are provided, said straps having to be wrapped around the motorcycle gas tank and then connected together by buckles or the like. This type of fastening is inconvenient in view of the fact that the bag must be removed from the tank each time the motorcycle is fueled and, as a rule, each time the motorcycle is parked.

An object of the invention is to provide a bag of the aforementioned type which is capable of being fastened to and removed from a motor vehicle, especially a motorcycle, in simple fashion.

This and other objects of the present invention are achieved according to the present invention in that the bag is provided on at least one side wall with at least one holding magnet. Permanent magnets can be made with extremely high holding forces today, so that the measure proposed by the invention permits the bag to be anchored sufficiently firmly to the gasoline tank of a motorcycle. Nevertheless, the bag can be removed from the tank when necessary in a relatively simple manner, without previous opening of a plurality of buckles or the like.

An especially good fastening of the bag to the tank wall is made possible when a plurality of holding magnets, located a certain distance apart, are provided in the side wall of the bag.

According to a preferred embodiment of the present invention, the side wall provided with the holding magnets is releasably connected to the bag. The bag proper can then be carried without the magnets, which do increase the weight perceptibly, while the removable side wall can be stowed for example, beneath the lockable seat of a motorcycle.

These and other objects, features and advantages of the present invention will become more apparent from the following description when taken in connection with the accompanying drawings, which show, for purposes of illustration only, one embodiment in accordance with the present invention.

Figure 1:
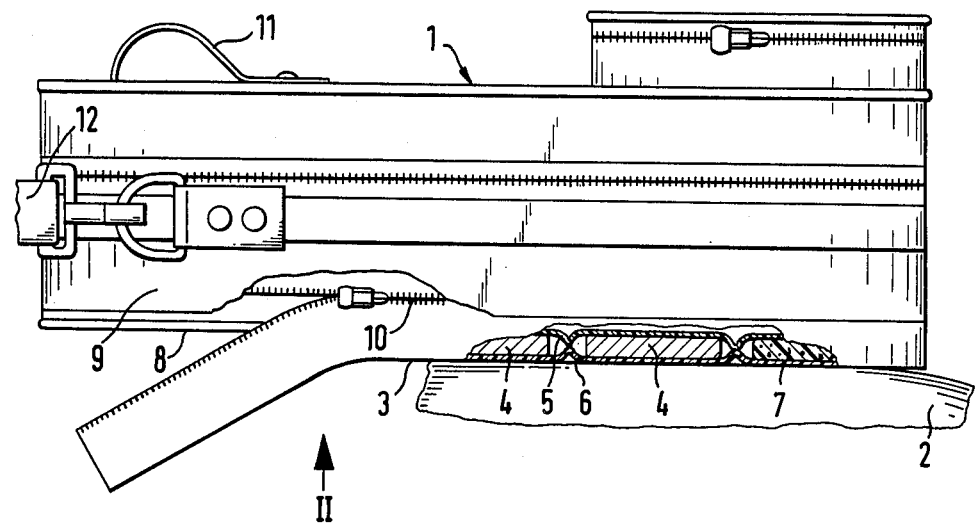
FIG. 1 is a side view, partly in section, of a bag according to the present invention and, FIG. 2 is a view in the direction of arrow II in FIG. 1.
Figure 2:
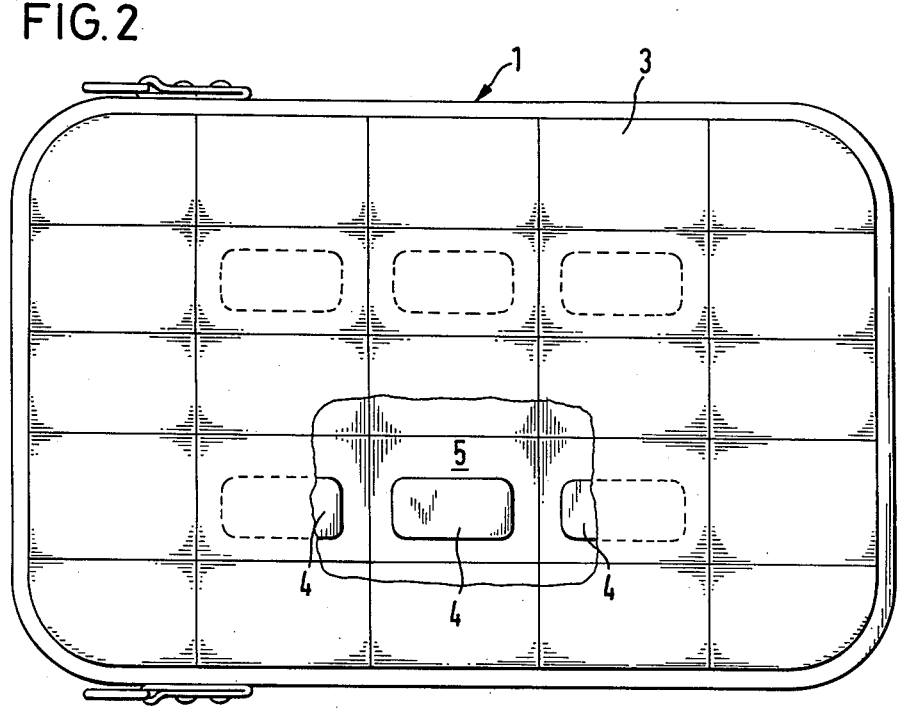

The bag 1 shown in the drawings is provided especially for motorcycle riders, and can be fastened to tank 2, merely indicated, on a motorcycle, not shown in greater detail. For this purpose, bag 1 is provided with a plurality of holding magnets 4 on one side wall 3. In the embodiment shown, a total of 6 holding magnets 4 are disposed in side wall 3.

The holding magnets 4 can be sewn or sealed between the two layers 5 and 6 of a two-layered side wall 3. The spaces formed by the lengthwise and cross seams are partially filled with holding magnets 4 and partially with foam 7. The seams provide good flexibility for this wall, despite the two-layered construction of side wall 3, so that the wall can adapt itself well even to curved tank walls.

Advantageously, outer layer 6 is made of a thin, solid gasoline-resistant plastic film. In this manner, holding magnets 4 can be mounted especially close to the tank wall, made of sheet metal, so that their holding force can be optimally utilized.

It is particularly advantageous if the side wall 3, provided with holding magnets 4, is releasably connected to bag 1. Side wall 3 then forms, so to speak, another side wall in addition to the actual side wall 8 of bag 1. When side wall 3 is removed from bag 1, the bag, especially due to the lack of holding magnets 4, not only has a lower weight, but also a more pleasing appearance, since there is no longer a need to make a distinction between the bag and a conventional shoulder bag. For this purpose, side wall 3 is preferably linked with bag 1 by a zipper 10, covered by a covering edge 9.

A loop 11, attachable with snaps, is also provided on the top side wall of the bag, said loop serving to hold mounting straps 12 to the bag, said straps being required only for carrying, when the bag is not mounted on the motorcycle.

While we have shown and described only one embodiment in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

I claim:

1. In a bag releasably fastenable to parts of a motor vehicle such as a motorcycle, the improvement comprising said bag being provided on at least one side wall with a plurality of holding magnets, wherein said side wall is a two-layered side wall with said plurality of magnets being sewn or sealed between said layers, and wherein said side wall is releasably connected with the bag.

2. The bag according to claim 1, wherein the outer layer of said two-layered side wall is made of a thin, strong, and gasoline-resistant plastic film.

3. The bag according to claim 1, wherein said side wall is connected to the bag by a zipper which is covered by a cover strip.

4. In a fuel tank bag for motorcycles, which bag is releasably fastenable to the fuel tank of a motorcycle, the improvement comprising said bag being provided on at least one side wall with a plurality of holding magnets, said side wall being formed of at least two layers with said plurality of magnets being disposed between said two layers, said two layers being connected at seams between at least some of said magnets, said seams providing good flexibility for said side wall whereby the wall can adopt itself to curved fuel tank walls.

5. The bag according to claim 4, wherein the outer layer of said two layers of the side wall is made of a thin, strong, and gasoline-resistant plastic film.

6. In a fuel tank bag for motorcycles, which bag is releasably fastenable to the fuel tank of a motorcycle, the improvement comprising said bag being provided on at least one side wall with a plurality of holding magnets and wherein said side wall is releasably connected with the bag by a zipper which is covered by a cover strip.

7. The bag according to claim 6, wherein said side wall comprises two layers with said plurality of holding magnets being disposed between said layers.

* * * * *